June 8, 1965　　　A. VON LÖWIS　　　3,188,103
FLUID SUSPENSIONS FOR VEHICLES
Filed May 11, 1964　　　5 Sheets-Sheet 1

INVENTOR
Alexander von Löwis of Menar by Michael J. Striker
Atty

FIG.5

3,188,103
FLUID SUSPENSIONS FOR VEHICLES
Alexander von Löwis of Menar, Mauren, Germany, assignor to Robert Bosch G.m.b.H., Stuttgart, Germany
Filed May 11, 1964, Ser. No. 366,283
Claims priority, application Germany, May 11, 1963, B 71,859
20 Claims. (Cl. 280—6.1)

The present invention relates to vehicle suspensions.

More particularly, the present invention relates to vehicle suspensions where the body of the vehicle is supported over the axles thereof by a plurality of variable-volume chamber means in which a suitable fluid under pressure, such as air, is located so as to support the body of the vehicle yieldably and resiliently over the axles thereof. In order to maintain the body at a given elevation over the axles during load variations or the like it is necessary to supply fluid under pressure to or withdraw fluid under pressure from the variable-volume chamber means, and it is known to provide a container for the fluid under pressure which cooperates with a pump which is actuated to supply fluid under pressure from the container to whichever chamber means requires additional fluid under pressure or to withdraw into the container fluid from whichever chamber means must have fluid under pressure withdrawn therefrom in order to maintain a given distance between the body and axles of the vehicle.

It is known that a considerable advantage is to be achieved by operating the pump with the fluid under pressure in the interior of such a container since in this case the difference between the fluid under pressure in the container and the maximum fluid pressure required for any chamber means is less than if the pump were required to provide the maximum pressure from the outer atmosphere, but at the same time difficulties are encountered if the same pump which is only required to provide the differential between the pressure in the container and the maximum pressure required for any chamber means is also required to fill the container with fluid under pressure from the outer atmosphere in order to maintain a certain minimum pressure in the container, and such filling will of course be required from time to time to take care of unavoidable leakage of the fluid under pressure.

One of the objects of the present invention is to provide a construction which when pumping fluid to any variable-volume chamber means will reliably cut off communication between the pressure side of the pump and the interior of the container and which when withdrawing fluid from any chamber means will act to cut off communication between the suction side of the pump and the interior of the container for the fluid under pressure.

Another object of the present invention is to provide a construction where a single pump capable of providing only the differential between the pressure in the container and the maximum pressure for any chamber means is used also for the purpose of filling the container from time to time to maintain the pressure therein above a certain minimum.

It is furthermore an object of the present invention to provide a structure which will reliably operate with purely mechanical elements to maintain a given elevation between the body and axles of the vehicle.

Also it is an object of the present invention to provide an electrical control structure for automatically maintaining a given distance between the body and axles of the vehicle.

Yet another object of the present invention is to provide a compact simple structural assembly which can operate reliably with minimum maintenance to automatically maintain a predetermined distance between the body and the axles of the vehicle irrespective of load variations, leakage losses, and the like.

With the above objects in view the invention includes, in a vehicle suspension, a plurality of variable-volume chamber means adapted to contain fluid under pressure and to be situated between the body and an axle means of the vehicle for maintaining the body at a given distance above the axle means while supporting the body at the vehicle in a yieldable, resilient manner. A plurality of pressure conduits communicate with the plurality of chamber means for supplying fluid under pressure thereto and a plurality of suction conduits communicate with the plurality of chamber means for withdrawing fluid therefrom, and a pump has its pressure side communicating with the pressure conduits and its suction side communicating with the suction conduits. A container for fluid under pressure houses the pump in the interior of the container, and at least one auxiliary pressure valve provides communication between the pressure side of the pump and the interior of the container while at least one auxiliary suction valve provides communication between the suction side of the pump and the interior of the container. A plurality of main pressure valves are connected to the plurality of pressure conduits for controlling the latter while a plurality of main suction valves are connected to the suction conduits, respectively, for controlling the latter. All of the main valves are normally closed while the auxiliary valves are normally open, and a plurality of control means sense when the distance between the body and the axle means of the vehicle changes from a given predetermined magnitude for actuating the several valves in such a way that when fluid under pressure must be supplied to any chamber means the main pressure valve of the pressure conduit communicating therewith is opened while the auxiliary pressure valve is closed so that at this time the pump can pump fluid from the container into the chamber means through its pressure conduit while sucking air through the normally open auxiliary suction valve from the interior of the container, and when fluid must be withdrawn from any one variable-volume chamber means the control means opens the main suction valve of its suction conduit and closes the auxiliary suction valve so that the pump can withdraw fluid through the now open suction conduit and discharge it through the normally open auxiliary pressure valve into the container. This single pump which thus cooperates with all of the variable-volume chamber means is only of a sufficient capacity to provide the pressure differential between a given minimum pressure in the interior of the container and the maximum pressure which may be required for any one variable-volume chamber means, but according to a further feature of the invention the pump means is also used for filling the container with air drawn from the outer atmosphere by providing a structure which automatically renders the several main valves inoperative so that they will remain in their normally closed positions while the pump is then operative to draw air from the outer atmosphere into the container for filling the latter to restore its pressure, so that during the time that the pump operates to restore the minimum pressure in the container it is not possible for the pump to simultaneously supply any fluid to any variable-volume chamber means, and thus a pump of relatively small capacity can be used with the structure of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 schematically illustrates the basic principles of the present invention, FIG. 1 showing a single variable-volume chamber means and a set of valves cooperating therewith and with a container as well as with a pump and a control means for controlling the valves;

Figure 2:
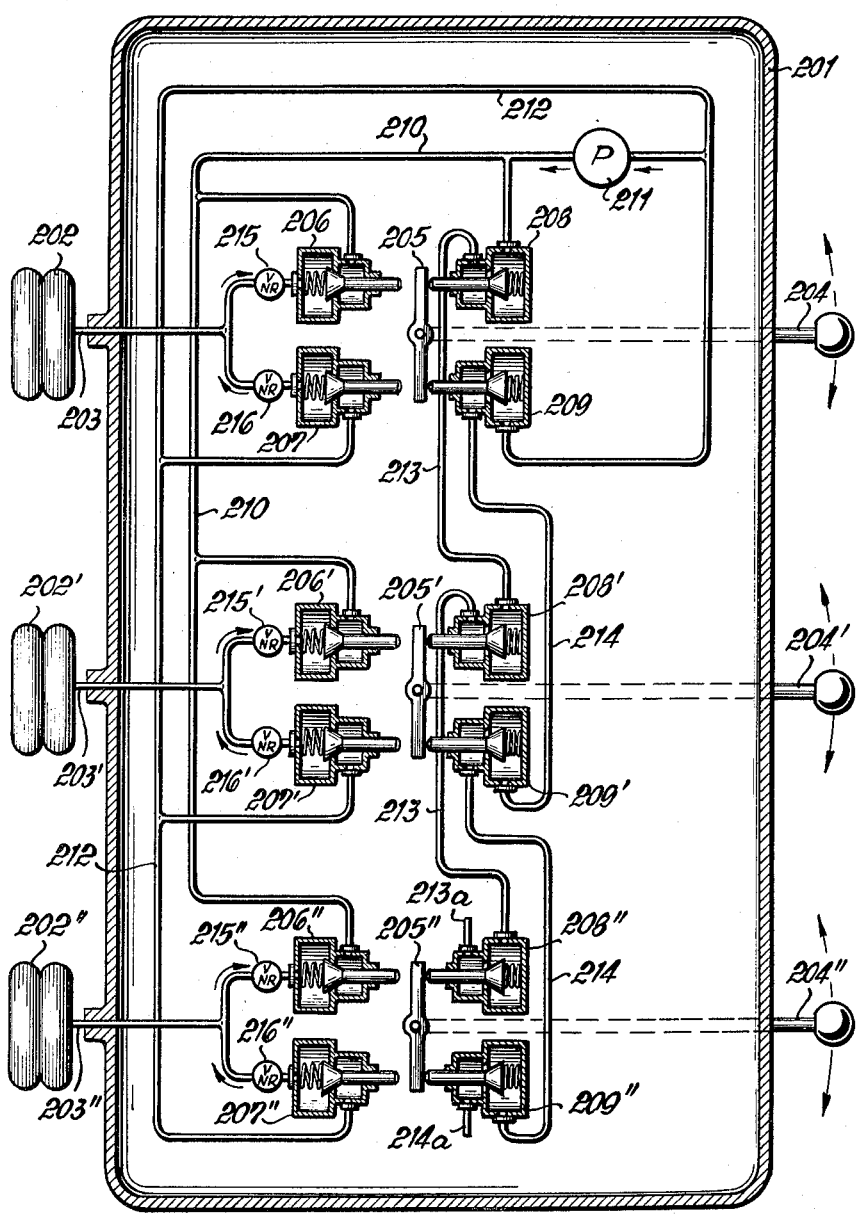
FIG. 2 shows one possible arrangement, in a schematic manner, for supplying air to and withdrawing air from a plurality of variable-volume chamber means with the structure of the invention.
Figure 4:
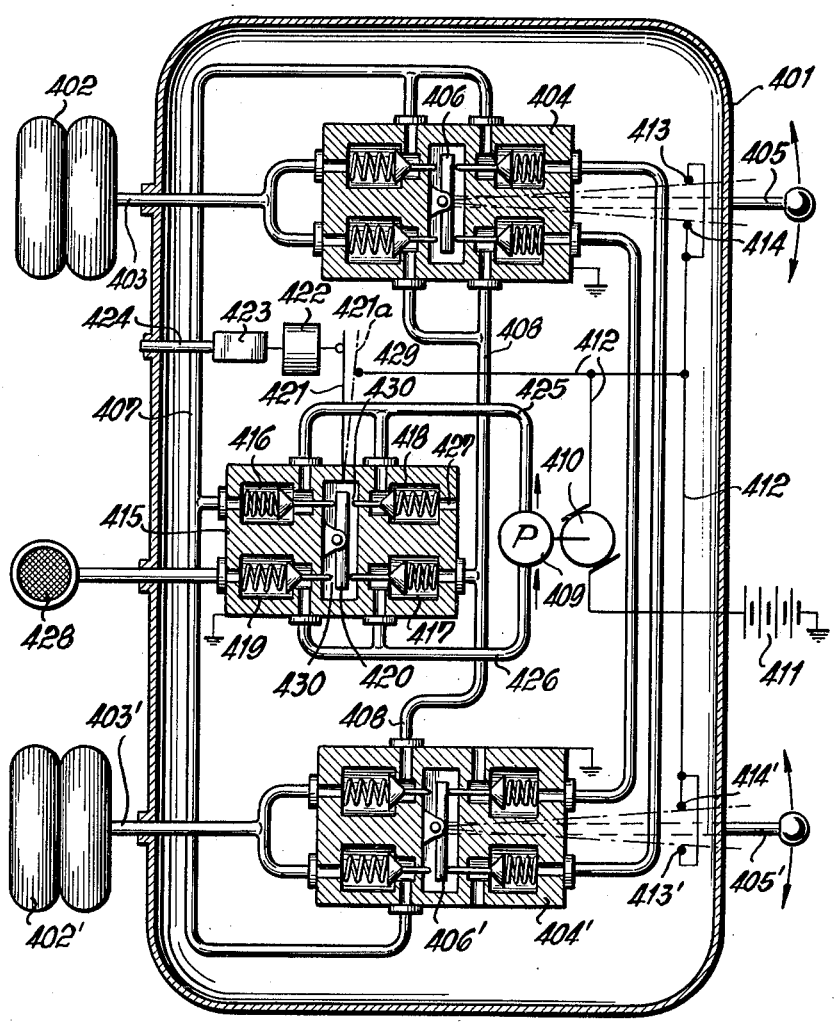
Figure 5:
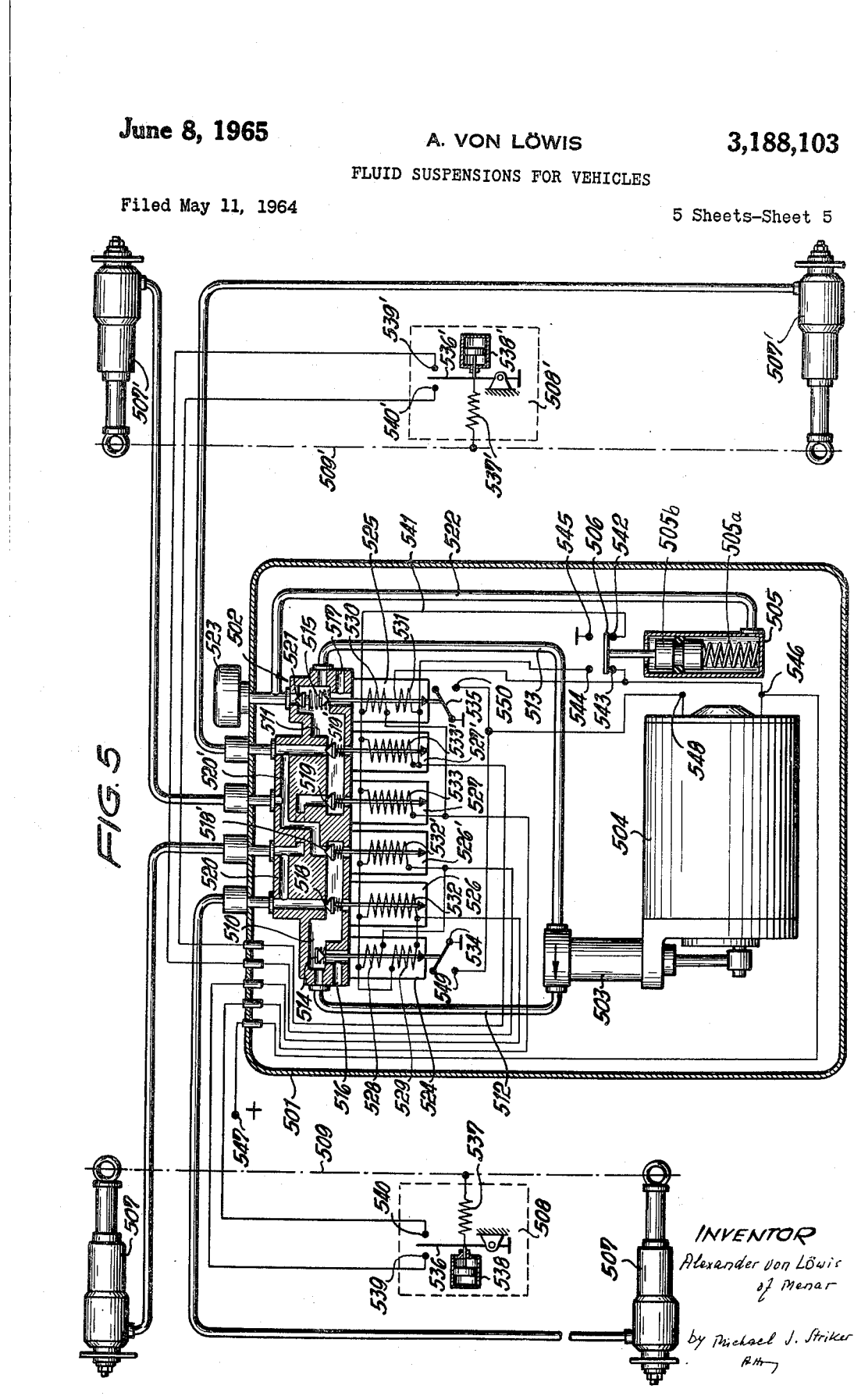

FIG. 4 shows an embodiment similar to FIG. 2 for supplying air to and withdrawing air from a plurality of variable-volume chamber means, FIG. 4 additionally illustrating in a schematic manner how the pump is operated for the purpose of filling the container which holds the supply of fluid under pressure; and FIG. 9 shows an embodiment in which electrical controls are provided for a plurality of variable-volume chamber means, FIG. 5 additionally illustrating another embodiment of a structure for filling the container to maintain the pressure therein above a given minimum value.

Figure 1:
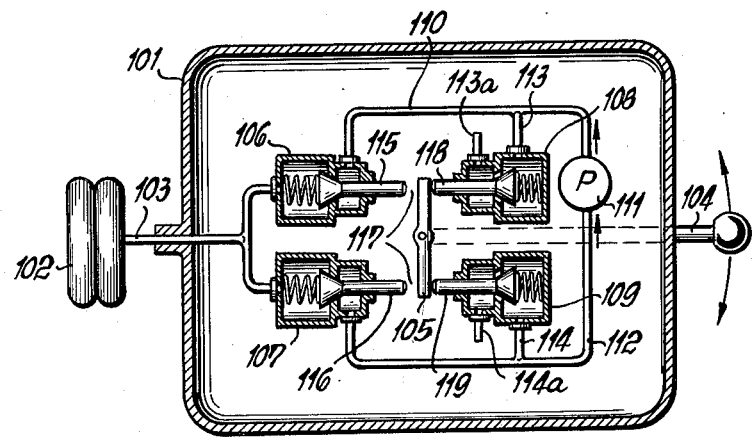

Referring now to FIG. 1 there is shown therein a container 101 for a fluid under pressure, such as air, for example, and several of the components of the structure of the invention are arranged within the container 101. However, the exterior of the container 101 accommodates a variable-volume chamber means 102, in the form of a bellows or other expansible and contractable chamber, and this variable-volume chamber means 102 is in communication with a conduit 103 which passes fluid-tightly through a wall of the container 101. Also situated at the exterior of the container 101 is a control means portion, namely a lever 104 which is connected to an element which also extends fluid-tightly through a wall of the container 101. The variable-volume chamber means 102 is mounted in a manner well known in the art between an axle of a vehicle and a body thereof to support the body in a yieldable resilient manner over the axle of the vehicle, and the lever 104 is adapted in a known way to sense the changes in the distance between the body of the vehicle and an axle therebeneath so that when there is a sufficient more or less permanent change in this distance between the vehicle body and vehicle axle the control means of the invention will actuate elements so as to restore the vehicle body to its predetermined distance above the axle, as will be apparent from the discussion which follows.

The control means includes in addition to the elevation sensing lever 104 a tiltable control member 105 situated almost entirely in the interior of the container 101. The control member 105 is elongated and at its center has a transverse pin extending fluid-tightly through a wall of the container 101 and supported in the wall of the container for turning movement about its axis, and it is this pin which is fixed to the lever 104 so that during turning of the lever 104 the elongated control member 105 will tilt in one direction or the other depending upon whether the vehicle body moves up or down with respect to the axle of the vehicle.

The manner in which the variable-volume chamber means 102 is mounted between the axle and the vehicle body, and indeed the details of the structure of the chamber 102 itself form no part of the present invention, and the same is true of the manner in which the lever 104 senses changes in the distance between the vehicle body and axle, so that these features are not further described or shown.

Inasmuch as the tilt-lever 105 of the control means 104, 105 is turnable together with the lever 104, the angular position of the lever 105 will of course be determined by the distance between the body of the vehicle and the axis therebeneath, and it is this tilt-lever 105 of the control means which determines the positions of a group of valves 106–109 which in a manner described below control the flow of fluid under pressure to and from the variable-volume chamber means 102.

Arranged within the housing or container 101 is a pump 111 driven and controlled by a structure which is not illustrated in FIG. 1, and the direction in which the pump 111 pumps the fluid is indicated by the arrow within the circle which represents the pump 111 in FIG. 1, so that a pressure conduit 110 which leads to and forms a continuation of the conduit 103 is connected to the pressure side of the pump 111 while a suction conduit 112 which also leads to and forms continuation of the conduit 103 communicates with the suction side of the pump 111. A main pressure valve 106 is carried by the pressure conduit 110 to control the flow of fluid therethrough, and this main pressure valve 106 is normally closed. It will be seen that the stem 115 of the main pressure valve 106 extends toward the tilt-lever 105 of the control means 104, 105. A main suction valve 107 is carried by the suction conduit 112 to control the flow of fluid therethrough, and the suction valve 107 also is normally closed and has a valve stem extending toward the tilt-lever 105, as indicated in FIG. 1.

The pressure conduit 110 has a branching portion 113 which is operatively connected with an auxiliary pressure valve 108, and this valve 108 has an outlet 113a communicating at all times with the interior of the container 101. The auxiliary pressure valve 108 is normally open, and it is apparent from FIG. 1 that in the neutral position of the tilt-lever 105 shown in FIG. 1 this tilt-lever maintains the stem 118 of the auxiliary pressure valve 108 in a position raised away from the seat and valve in opposition to a spring which tends to close the valve, so that in this way the auxiliary pressure valve 108 is normally open and thus provides communication between the pressure conduit 110 and the interior of the container through the conduits 113 and 113a between which the valve 108 is interposed.

In much the same way the suction conduit 112 has a branch 114 communicating with an auxiliary suction valve 109 which also has a stem 119 engaged by the tilt-lever 105 in the neutral position of the control means, so that the auxiliary suction valve 109 also is normally open, and it has an outlet 114a communicating with the interior of the container 101, so that through the normally open valve 109 and the conduits 114 and 114a the suction conduit 112 will normally be in communication with the interior of the container 101. Of course, in the position of the parts shown in FIG. 1 if the motor 111 should operate it will simply suck air through the normally open valve 109 along the suction conduit 112 and out through the pressure conduit 110 to the conduit 113 from where the fluid will discharge through the open auxiliary pressure valve 108 and the outlet 113a back into the container, so that at this time the fluid would simply circulate, although the structure can be of the type, as described below, where the circuit of a motor which drives the pump is closed only when the tilt-lever 105 of the control means is tilted in one direction or the other from its neutral position shown in FIG. 1.

It is apparent that with the structure as shown in FIG. 1 if the tilt-lever 105 tilts in a clockwise direction the suction valve 107 will be opened while the auxiliary suction valve 109 will close, and of course the auxiliary pressure valve 108 will simply remain in its open position while the pressure valve 106 will remain closed, and if the tilt-lever 105 should turn in a counterclockwise direction, as viewed in FIG. 1, the main pressure valve 106 will open while the auxiliary pressure valve 108 will close, the main suction valve 107 will remain unchanged and the auxiliary suction valve 109 will remain open.

As was pointed out above the parts are shown in FIG.

1 in their neutral position where the vehicle body is situated at the predetermined desired distance above the axle of the vehicle. In this position there is a predetermined appreciable clearance 117 between the stems 115 and 116 of the main pressure and suction valves 106 and 107, respectively, and the tilt-lever 105 so that in this way very slight transitory changes in elevation of the body resulting from irregularities in a road along which a vehicle travels, for example, will have no influence on the structure.

Assuming now that the distance between the body of the vehicle and the axle of the vehicle changes, for example decreases due to an increase in the load, then the tilt-lever 105 turns in a counterclockwise direction, as viewed in FIG. 1, opening the main pressure valve 106 and closing the auxiliary pressure valve 108 as pointed out above. The result of the closing of the auxiliary pressure valve 108 is to cut off communication between the pressure conduit 110 and the interior of the container 101, while the auxiliary suction valve 109 still provides communication between the suction conduit 112 and the interior of the container, so that at this time the pump 111 will operate to take air under pressure from the interior of the container through the open auxiliary suction valve 109 and conduit 112, through the pump, out through the pressure conduit 110 and the now open main pressure valve 106 and into the variable-volume chamber means 102 so as to increase the volume thereof until the tilt-lever 105 again resumes its neutral position thus terminating the operations with the parts again in the position shown in FIG. 1, and in this way the structure will operate automatically to maintain a given distance between the vehicle body and vehicle axle in a fully automatic manner.

The structure operates in a corresponding manner in the case of a withdrawal of fluid under pressure from the variable-volume chamber means 102. Thus, assuming, for example, that because of a sudden reduction in load the distance between vehicle body and axle increases beyond a predetermined range, then the control means 104, 105 will sense this change and the tilt-lever 105 will automatically turn in a clockwise direction, as viewed in FIG. 1, releasing the auxiliary suction valve 109 so that it will close and opening the normally closed main suction valve 107. Thus, at this time the fluid under pressure will flow through the suction conduit 112 and the pump 111 into the container 101 through the conduits 113, 113a and the open auxiliary pressure valve 108 which maintains communication between the conduit 110 and the interior of the container 101 at this time, and it is to be noted that in this case also the closing of the auxiliary suction valve 109 has cut off communication between the suction conduit 112 and the interior of the container so that the fluid from the variable-volume chamber means 102 can flow only to the pump 111 and out into the container through the normally open auxiliary pressure valve 108.

FIG. 2 schematically illustrates an embodiment of the invention for controlling a plurality of variable-volume chamber means, and in the particular embodiment of FIG. 2 the structure will provide independent controls for the several variable-volume chamber means of which three are shown in the example of FIG. 2.

Referring now to FIG. 2 it will be seen that there is a single container 201 for the fluid under pressure and it is from this container 201 that all of the compressed fluid for all of the variable-volume chamber means is withdrawn and to which the compressed fluid is returned from the variable-volume chamber means. The three variable-volume chamber means 202, 202', 202" respectively communicate through conduits 203, 203' and 203" with sets of pressure and suction conduits forming extensions of the conduits 203, 203', 203" in a manner, for each variable-volume chamber means, substantially identical with the arrangement of FIG. 1. For each variable-volume chamber means of FIG. 2 there is a separate control means, and it will be seen that control means 204, 205 substantially identical with control means of FIG. 1 is provided for the chamber 202, while corresponding control means 204', 205' and 204", 205" are provided for the pair of additional variable-volume chamber means 202' and 202" illustrated in FIG. 2. The levers 204, 204', 204" will respectively sense changes in the elevation of the vehicle body with respect to the vehicle axles at the locations where the vehicle body is supported over the axles by the variable-volume chamber means 202, 202', 202", and in response to a change of a given magnitude in the predetermined distance between the vehicle and axle at any one of the locations where the variable-volume chamber means are located the structure will automatically respond to increase the volume of the variable-volume chamber means or decrease the volume thereof in a manner described above in connection with FIG. 1.

Thus, it will be seen that the tilt-lever 205 maintains an auxiliary pressure valve 208 and an auxiliary suction valve 209 open while upon turning of the tilt-lever 205 it will open or the other of the normally closed main pressure and suction valves 206 and 207 which respectively communicate through the pressure and suction conduits 210 and 212 with the conduit 203 which forms an extension of these conduits 210 and 212, the valves 206 and 207 being carried by the conduits 210 and 212 at the places where they communicate with the conduit 203 for closing these conduits and thus the chamber 202 when the tilt-lever 205 is in its neutral position.

In the same way the additional valve assemblies of FIG. 2 include the main pressure and suction valves 206' and 207' and the auxiliary pressure and suction valves 208' and 209' forming the valve assembly for the variable-volume chamber means 202', and the main pressure and suction valves 206" and 207" and the auxiliary pressure and suction valves 208" and 209" which form the valve assembly for the variable-volume chamber means 202". It will be seen from FIG. 2 that the pressure conduit 210 which communicates with the pressure side of the pump 211 in effect is a header having branches leading therefrom to the several main pressure valves 206, 206' and 206", and in the same way the suction conduit 212 which communicates with the suction side of the pump 211 is in the form of a header having branches leading therefrom to the main suction valves 207, 207', and 207".

In much the same way as with the embodiment of FIG. 1, the pressure conduit 210 has a branch 213 leading therefrom between the pump 211 and the main pressure valve 206, and it is in this branch 213 that the several auxiliary pressure valves 208, 208', 208" are arranged in series in the manner shown in FIG. 2 with only the last auxiliary pressure valve 208" having an outlet 213a which communicates with the interior of the container 201, so that with the embodiment of FIG. 2 all of the normally open auxiliary pressure valves communicate with each other and with the interior of the container 201 when the several control means are in their neutral position as illustrated in FIG. 2.

In much the same way the suction conduit 212 has a branch 214 which leads through the several auxiliary suction valves 209, 209', and 209", and it is only this latter auxiliary suction valve which has an outlet 214a communicating with the interior of the container 201, so that all of the auxiliary, normally open suction valves 209, 209', and 209" communicate with each other and with the interior of the container 201 in the neutral position of the several control means shown in FIG. 2.

It is apparent that depending upon the direction of turning of any one of the several control means 204, 205; 204', 205'; 204", 205" of FIG. 2 the corresponding main pressure or suction valves will open and simultaneously the corresponding auxiliary pressure or suction valve will close to cut off communication between the pressure conduit and the interior of the container 201 in the event that a main pressure valve is opened and to cut off communication between the suction conduit and the interior of the container 201 in the event that a main suction valve is opened. Thus the operation of each of the assemblies of FIG. 2 is essentially the same as that of FIG. 1.

It is to be noted that with both the above-described embodiments all the controls are brought about in a purely mechanical way although it is of course to be understood that the invention can use other corresponding structures which will operate the valves through an electrical means, for example. In FIG. 2 there is but a single pump 211 and in this case also the structure for driving and controlling the pump is not illustrated.

The embodiment of FIG. 2 operates in the following manner:

Inasmuch as the neutral positions of the several control means of FIG. 2 corresponding fully to the operations achieved by the neutral position of the control means of FIG. 1, the several variable-volume chamber means of FIG. 2 are completely closed in the position of the parts shown in FIG. 2. If any of the control means call for fluid to be supplied to or withdrawn from a variable-volume chamber means, the structure will operate also in a manner very similar to that of FIG. 1 to bring about these results in a fully automatic manner. For example, assuming that the control means 204', 205' turns in a direction which requires additional fluid to be supplied to the variable-volume chamber means 202', then of course the elements 204', 205' will have turned in a counterclockwise direction, as viewed in FIG. 2, through a distance sufficient to open the main pressure valve 206' and close the auxiliary pressure valve 208', so that the pressure side of the pump 211 now communicates through the pressure conduit 210 and the open valve 206' with the interior of the variable-volume chamber means 202' through the conduit 203' which forms an extension of the conduit 210, as pointed out above, and at this time the pump 211 will drive the fluid which delivers to the variable-volume chamber means 202' from the interior of the container 201 through the suction conduit 214. It is to be noted that this fluid will enter through the inlet 214a and will pass around through the conduit 214 and the several normally open valves 209", 209', and 209 before reaching the pump 211 in order to be pumped therefrom through the pressure conduit 210 and into the container 202' in the above example.

Substantially the same operations are produced for each of the variable-volume chamber means of FIG. 2 when the several control means operate either separately or simultaneously in the same direction. Of course, if it should happen that two or more of the main pressure valves are simultaneously open, then since the variable-volume chamber means which communicate with these open main pressure valves communicates simultaneously with the pressure conduit 210 and with each other there will be an equalization of the pressure in two or more of the variable-volume chamber means where their main pressure valves are simultaneously open, and in the same way there will be an equalization of pressure between the two or more variable-volume chamber means whose suction valves are simultaneously open in the case that the controls call for a reduction in volume, so that with the embodiment of FIG. 2 there will be during simultaneous operation of two or more control means in the same direction direct communication between the plurality of variable-volume chamber means whose main valves have been opened, with the result that an equalization will occur. It may be that such equalization is not desirable, and for this purpose non-return valves 215, 215', 215" can be situated at the place where the conduits 203, 203', 203" respectively communicate with the main pressure valves 206, 206', 206". In the same way the non-return valves 216, 216', 216" are respectively provided in the suction conduits between the several main suction valves 207, 207', 207" and the several variable-volume chamber means 202, 202', 202", so as to prevent direct communication between the several variable-volume chamber means in the event that the several control means simultaneously call for movement of fluid in the same direction.

On the other hand, if two valve assemblies are simultaneously controlled by their control means to provide flow of fluid simultaneously in opposite directions, then somewhat different operations will occur. For example, in the event that the control means 204', 205' calls for filling the variable-volume chamber means 202' with additional fluid under pressure while the control means 204", 205" simultaneously calls for withdrawing fluid under pressure from the variable-volume chamber means 202", then the control means 204', 205' will have turned in a counterclockwise direction, as viewed in FIG. 2, for closing the auxiliary pressure valve 208' and opening the main pressure valve 206', while simultaneously the control means 204", 205" have turned in a clockwise direction, opening the main suction valve 207" and closing the auxiliary suction valve 209". In this case it will be seen that the closing of the auxiliary suction valve 209" cuts off communication between the conduit 214 and the interior of container 201 so that the pump 211 derives its fluid from the variable-volume chamber means 202" through the now open valve 207" and the suction conduit 212, and the fluid is delivered through the pressure conduit 210 and the now open main pressure valve 206' into the variable-volume chamber means 202', so that in this particular example the pump 211 acts to disperse fluid out of the variable-volume chamber means 202' into the variable-volume chamber means 202". This operation will continue until one or the other of the control means 204', 205' and 204", 205" has reached its neutral position, whereupon the operation will continue in the manner described above for the remaining variable-volume chamber means which still must have its volume adjusted.

The above-described operations of FIG. 2 also take place in a corresponding manner in the event that two of the valve assemblies are actuated in the same way by their control means to provide a flow of fluid in one direction while the remaining valve assembly is actuated by its control means simultaneously to provide a flow of fluid in the opposite direction.

Figure 3:
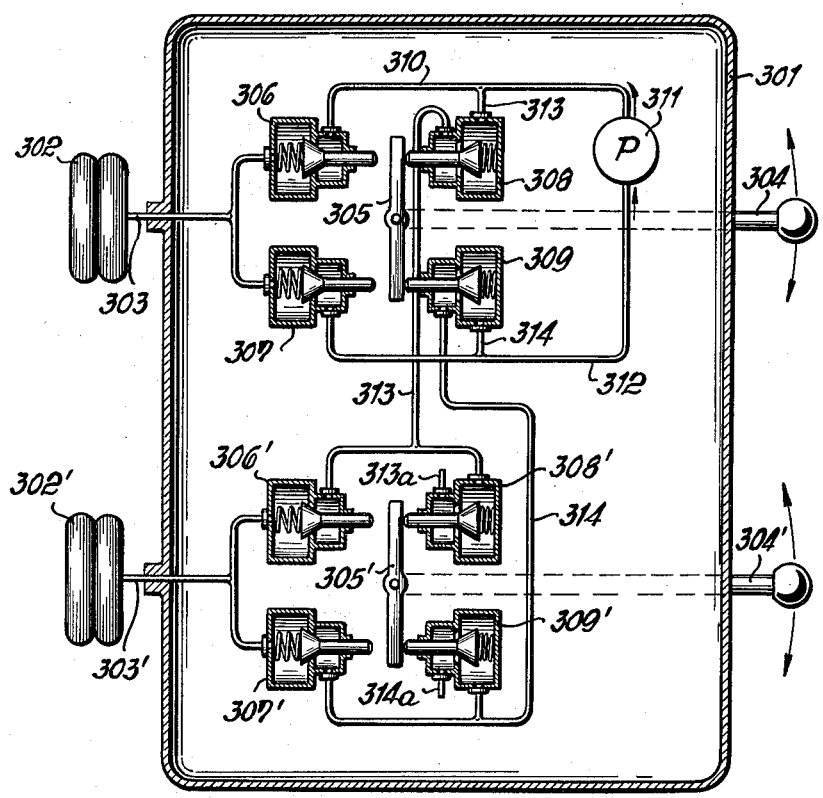
FIG. 3 shows another embodiment of a structure according to the invention for supplying fluid to or withdrawing it from a plurality of variable-volume chamber means.

It is to be noted that with the embodiment of FIG. 2 when two or more of the control means simultaneously call for a flow of fluid the several variable-volume chamber means controlled thereby have the fluid flowing to or from these variable-volume chamber means simultaneously, which is to say the controls for several of the variable-volume chamber means do not take place sequentially one after the other but rather simultaneously. Such an arrangement may be highly desirable in the case of simultaneous calling for a flow of fluid in opposite directions in a pair of variable-volume chamber means since, as was pointed out above, in this case the fluid will flow rapidly out of one variable-volume chamber means and into the other, so that such a simultaneous operation is in fact desirable. However, when it comes to simultaneous flow of fluid in the same direction with respect to two or more of the variable-volume chamber means, the pump which only has a given capacity will simultaneously deliver fluid to or withdraw fluid from two or more of the variable-volume chamber means with the result that the plurality of variable-volume chamber means have the fluid flowing to or from the same through a period which is twice as long as would be required if a single variable-volume chamber means were to be controlled, as compared to the case where two variable-volume chamber means are simultaneously controlled by providing fluid flow in the same direction. This control period which doubles the time for the control in the case of two variable-volume chamber means which must have fluid flowing in the same direction, or even triples the time in the case of three variable volume chamber means which simultaneously require fluid to flow in the same direction, may be highly undesirable, and FIG. 3 shows an arrangement where a plurality of variable-volume chamber means will have their control operations carried out in sequence, rather than simultaneously, even in the case where the plurality of control means simultaneously indicate the necessity of adjustments. In FIG. 3 the structure for driving and controlling the air pump is again omitted.

Referring now to FIG. 3 it will be seen that the container 301 for the fluid under pressure has its interior space accommodating the valve assemblies and pump as well as the tilt levers of the control means. At the exterior of the container 301 are a pair of variable-volume chamber means 302, 302', and through the conduits 303, and 303', which pass fluid-tightly through the wall of the container 301, these conduits communicate with valve assemblies in the manner described above, but in the embodiment of FIG. 3 the pair of valve assemblies illustrated communicate with each other in a manner different from the other embodiments.

Thus, it will be seen that the pressure side of the pump 311 communicates through a pressure conduit 310 with the conduit 303 leading to the variable-volume chamber means 302, and in this pressure conduit 310 is situated the main, normally closed pressure valve 306, while the suction side of the pump 311 communicates with a suction conduit 312 which again communicates with the variable-volume chamber means 302 through the conduit 303 and which has the main suction valve 307 which is normally closed. The pressure conduit 310 has a branch 313 communicating with an auxiliary pressure valve 308 and the suction conduit 312 has a branch 314 communicating with an auxiliary suction valve 309, and these suction valves 308 and 309 are normally open, while the pressure valves 306 and 307 are normally closed so that to this extent at least the structure of FIG. 3 for the upper unit is similar to that of FIG. 1.

The lower unit of FIG. 3 includes a main pressure valve 306' and an auxiliary pressure valve 308' as well as a main suction valve 307' and an auxiliary suction valve 309', but it will be seen that the main and auxiliary pressure valves of the lower unit of FIG. 3 communicate through part of the conduit 313 with the auxiliary pressure valve 308. It is the auxiliary pressure valve 308' which has the outlet 313a communicating with the interior of the container 301.

In a similar manner the main and auxiliary suction valves 307', 309' do not communicate directly with the pump 311 or the suction conduit 312, but instead these valves communicate through part of the branch 314 with the auxiliary suction valve 309 which communicates more or less directly with the suction conduit 312, and it is the auxiliary suction valve 309' which has the outlet 314a communicating with the interior of the chamber 301.

A control means 304, 305 controls the upper valve assembly of FIG. 3 in a manner described above while a control means 304', 305' controls the lower valve assembly of FIG. 3 also in the manner described above.

The structure of FIG. 3 operates in the following manner:

Assuming that the control means 304, 305 of FIG. 3 has turned in a counter-clockwise direction, as viewed in FIG. 3, indicating that additional fluid under pressure must be supplied to the variable-volume chamber means 302, then the auxiliary pressure valve 308 will close while the main pressure valve 306 will open, and the result is that the pressure conduit 310 is closed off from communication with the interior of the container 301, as a result of the closing of the auxiliary pressure valve 308. The fluid will now flow through the inlet 314a into the auxiliary suction valve 309' from the latter along the conduit branch 314 and the other auxiliary suction valve 309 into the suction conduit 312, through the pump 311 and under pressure through the conduit 310 and the now open main pressure valve 306 into the variable volume chamber means 302.

It is to be noted that the closing of the auxiliary pressure valve 308 has cut off the lower pressure valves 306', 308' from the pressure conduit 310, so that even if the control means 304', 305' calls for addition of fluid under pressure to the variable-volume chamber means 302' simultaneously with the addition of fluid under pressure to the variable-volume chamber means 302, such addition would not take place until the control means 304, 305 again resumed its neutral position opening the auxiliary pressure valve 308 so that from the pressure conduit 310 the fluid would now flow to the lower open main pressure valve 306', and of course the upper main pressure valve 306 of FIG. 3 would be closed at this time, as well as the auxiliary pressure valve 308', so that it is clear that in this embodiment it is not until supply of fluid under pressure to the variable-volume chamber means 302 has been completed that the supply of fluid under pressure to the variable-volume chamber means 302' will commence, and the same sequential type of operation obtains for withdrawal of fluid from the variable-volume chamber means 302, 302'. Thus if the upper auxiliary suction valve 309 of FIG. 3 is closed, it is clear that the lower suction valve 307', 309' cannot communicate with the suction conduit 312 which leads to the suction side of the pump 311, so that it is only after withdrawal operations for the variable-volume chamber means 302 have been completed that it is possible for the same operation to take place with the variable-volume chamber means 302'.

However, it is noted that the embodiment of FIG. 3 can carry on simultaneously a flow of fluid in opposite directions for the pair of variable-volume chamber means. For example, assume that while the upper control means 304, 305 controls the upper valve assembly of FIG. 3 to add fluid under pressure to the variable-volume chamber means 302, the lower control means 304', 305' calls for withdrawal of fluid from the variable-volume chamber means 302', then it is clear that at this time the valve 307' will be open while the valve 309' will be closed, but the auxiliary suction valve 309 of the upper unit is still open so that the fluid flowing out of the variable-volume chamber means 302' can flow through the now opened main suction valve 307' along the conduit 314 and the open auxiliary suction valve 309 to the suction side of the pump 311, through the suction conduit 312, and then along the pressure conduit 310 to the open main pressure valve 306 to the variable-volume chamber means 302, so that with the embodiment of FIG. 3 in the event of a pair of control means simultaneously calling for flow of fluid in opposite directions there will be a flow from one variable-volume chamber means to the other, so that the advantage of FIG. 2 is retained while the disadvantage of simultaneous operation when the fluid flow in the same direction is called for at a plurality of variable-volume chamber means is eliminated with the embodiment of FIG. 3.

On the other hand, if the lower control means 304', 305' of FIG. 3 initially calls for a change in the volume of the variable-volume chamber means 302' and then the upper control means 304, 305 calls for a change in the volume of the variable-volume chamber means 302, it is clear that the operations for the variable-volume chamber means 302' will be interrupted until the operations for the variable-volume chamber means 302 are completed, and then the operations will continue for the variable-volume chamber means 302'. Of course, this only applies to the case where the upper control means 304, 305 calls for a flow of fluid in the same direction as that initially called for by the lower control means 304', 305'.

Of course, the preferential operations of the upper group of components of FIG. 3 as compared to the lower group is not essential to the invention and it is within the scope of the invention to avoid such preference for any one group by suitable connections. Moreover, it is to be noted that the principles shown in FIG. 3 as applied to a pair of installations associated with a pair of the variable-volume chamber means can equally well apply to three or more installations. Assuming that there were a third group of valves and a third variable-volume chamber means in FIG. 3, then the third group would be connected to the lower group of FIG. 3 in the same way that the lower group is connected to the upper group, and the operations would go forward in much the same way as described above, but the details of this operation would be relatively cumbersome and complex to set forth.

FIG. 4 illustrates an installation for independently supplying a pair of variable-volume chamber means with fluid under pressure, the arrangement of FIG. 4 corresponding to the schematic arrangement illustrated in FIG. 2. However, FIG. 4 shows the structure for driving and controlling the pump as well as a structure for maintaining the interior of the container filled with fluid above a predetermined pressure.

Referring now to FIG. 4, there is shown therein the container 401 for the fluid under pressure, and there are illustrated at 402 and 402′ a pair of variable-volume chamber means adapted to be situated in a manner well known in the art between a vehicle body and an axle means therebeneath for yieldably and resiliently supporting the vehicle body at a predetermined distance above the axle means. A valve assembly 404 identical with any of the above assemblies is operatively connected with the chamber means 402 by way of the conduit 403, while a valve assembly 404′, also identical with any of the above valve assemblies, communicates with the chamber 402′ through the conduit 403′. The control means 405, 406 controls in a manner described above the valves of the valve assembly 404, while the control means 405′, 406′ controls in the manner described above the valves of the valve assembly 404′. Of course the angular positions of the pair of control means are determined by the distance between the body of the vehicle and the axle means therebeneath, as was described above.

It is to be noted that each of the valve assemblies 404 and 404′ is united into a single structural unit. The pump 409 has its pressure side communicating in a manner described in greater detail below with the pressure conduit 407 which leads to the main and auxiliary pressure valves of each of the valve assemblies 404 and 404′. It is to be noted that the pressure conduit 407 communicates with the auxiliary pressure valve of the assembly 404′ through a conduit which interconnects the pair of auxiliary pressure valves, and it is only the auxiliary pressure valve of the lower assembly 404′ of FIG. 4 which has an outlet communicating with the interior of the container 401. The suction side of the pump 409 communicates also in a manner described in greater detail below with a suction conduit 408 which communicates with the main and auxiliary suction valves of the assemblies 404 and 404′, and in this case also it is to be noted that the suction conduit 408 communicates with the auxiliary suction valve of the assembly 404′ through a conduit which interconnects the pair of auxiliary suction valves, while only the auxiliary suction valve of the assembly 404′ has an outlet communicating with the interior of the chamber 401. It is therefore apparent that the arrangement of FIG. 4 corresponds in all respects to the arrangement of FIG. 2, except that in FIG. 4 the arrangement is illustrated as applied to only a pair of variable-volume chamber means while in FIG. 2 the arrangement is shown as applied to three variable-volume chamber means.

FIG. 4 also illustrates the electric motor 410 operatively connected to the pump 409 for driving the latter, and this motor 410 is connected to one of the poles of a source of current 411, while the other pole of the motor is connected to a conductor 412. The other pole of the source of current 411 is connected to ground, and the conductor 412 has branches leading to the operating contacts 413, 414, for the upper assembly of FIG. 4, and 413′, 414′, for the lower assembly of FIG. 4. The levers 405 and 405′ of the pair of control means cooperate with the latter contacts so that when they are engaged by the levers the circuit of the motor 410 is completed through the conductor 412, the lever 405 or 405′, the housing of the corresponding valve assembly 404 or 404′, and ground. Thus, the levers 405 and 405′ are electrically conductive and by engaging the contacts 413, 414 in the case of lever 405 and 414′, 413′, in the case of lever 405′ complete the circuit to the motor, and of course the motor will not start until the distance between the vehicle body and axle means has changed by an amount sufficient to provide the angular displacement which will place the lever of the control means in engagement with one or the other of the pair of switches for starting the motor.

The pressure conduit 407 and the suction conduit 408 are connected to the pump 409 through an additional assembly of four valves 416–419, united into a single unit and also situated within the container 401. The structure for controlling the valves 416–419 is a single tilt-lever 420 similar to the tilt-levers 406 and 406′ and cooperating in the same way with the several valves 416–419. The tilt-lever 420 is connected to lever 421 which is in turn connected through a quick-action switch 422 to a pressure measuring unit 423, and it is this unit 423 which, in accordance with the pressure which it measures, controls the angular position of the lever 421 and thus of the tilt-lever 430 which control the valves 416–419.

The pressure measuring device 423 communicates with the exterior by way of a conduit 424 which passes through a wall of the container 401 in a fluid-tight manner, and this pressure measuring device 423 automatically assumes a position determined by the pressure of the fluid within the container 401.

The pressure measuring device 423 and the quick-action switch 422 coupled thereto maintain the lever 421 and the tilt-lever 420 therewith in the neutral position illustrated in FIG. 4 as long as the pressure in the container 401 is above a predetermined pressure. However, when the pressure in the container 401 falls below the predetermined pressure the lever 421 is displaced to the dot-dash line postion 421a by the pressure measuring device 423 and the switch 422.

In the normal position of the lever 421 and the tilt-lever 420 the valves 416 and 417 are maintained open so that the pressure conduit 407 communicates through the valve 416 and the conduit 425 with the pressure side of the pump 409 while the suction conduit 408 communicates through the open valve 417 and the conduit 426 with the suction side of the pump 409. In this normal position of the lever 421 the valves 418 and 419 are closed, the valve 418 cutting off communication between the conduit 425 and the opening 427 leading from valve 418 to the interior of the container 401, and the valve 419 cutting off communication between the suction conduit 426 and a conduit 428 leading to the exterior of the container, in a fluid-tight manner through the wall thereof, and carrying at the exterior of the container an air filter indicated by the hatched circle at the left end of conduit 428 in FIG. 4. When the lever 421 has been moved to the position 421a, it engages a contact 429 which is electrically connected with the conductor 412.

As long as the air pressure in the container 401 is above a predetermined value, the operation of the structure of FIG. 4 corresponds fully to that of FIG. 2, inasmuch as the pressure and suction conduits 407 and 408 are connected to the pressure and suction sides of the pump 409 and to the valve assemblies 404 and 404′ in the manner shown schematically in FIG. 2.

On the other hand, if the pressure in container 401 has fallen below this predetermined pressure value, as it inevitably will due to leakage losses, then the lever 421 assumes the position 421a and the circuit of the motor 410 is closed so that the pump 409 will now start to operate. The displacement of the lever 421 to the position 421a has caused the valves 418 and 419, which are normally closed, to open, since the turning lever 420 has engaged these valves and open them, and furthermore the normally open valves 416 and 417 are now closed. FIG. 4 illustrates the clearance 430 between the tilt-lever 420 and the stems of the valves 419 and 418 when the tilt-lever 420 is in its neutral position. Thus, with the pump 409 operating and the valves 416–419 having the above positions determined by the turning of the lever 421 to the position 421a, the air from the exterior will be sucked through the conduit 428 and the open valve 419 into the conduit 426 and through the pump 409 into the conduit 425 and from the latter through the now open valve 418 to the outlet 427 from where the air will flow into the container 401 in order to increase the pressure therein. The filling of the container ends automatically when the pressure again reaches the predetermined value for which it has been set, and upon reaching this predetermined value the pressure measuring device 423 acts through the switch 422 on the lever 421 to return it to the normal position shown in FIG. 4.

Assuming now that during the filling of the container 401 with air from the exterior by the pump 409 in the manner described above there is a call by one of the control means 405 or 405′ for air to be supplied to or withdrawn from one of the variable-volume chamber means 402 or 402′, then of course the corresponding main pressure or suction valves will be opened, and although communication is provided in this way through the main pressure or suction valve with the pressure or suction conduit, nevertheless there will be no withdrawal of fluid from or supply of fluid to either of the variable-volume chamber means as long as the filling operations continue, because the pressure and suction conduits 407 and 408 are blocked from communication with the pump 409 at this time. Thus, it will be seen that when the lever 421 assumes the position 421a, the normally open valves 416 and 417 close, and as a result the pressure conduit 407 is blocked by the now closed valve 416 from communicating with the pressure side of the pump 409 to the conduit 425, and the suction conduit 408 is blocked by the now closed valve 417 from communicating with the suction side of the pump 409 through the conduit 426, and therefore as a result during the time when the container 401 is being filled there will be no flow of fluid to or from the variable-volume chamber means 402 and 402′ even though the control means 405, 406 or 405′, 406′ may call for such a flow of fluid. In the event of simultaneous calling by both of the control means of FIG. 4 for different directions of fluid flow in the respective variable-volume chamber means 402 and 402′, the blocked communication between the pressure and suction conduits and the pump as described above will prevent any flow of fluid. On the other hand, if both of the control means of FIG. 4 simultaneously call for a flow of fluid in the same direction, then it will be possible for the pair of variable-volume chamber means to communicate with each other and the pressure therein will become equalized while the filling of the container 401 proceeds. Thus, it will be seen from FIG. 4 that when both of the control means open the normally closed main pressure valves shown at the upper left of the assembly 404 and the lower left of the assembly 404′, then these valves will place the chambers 402 and 402′ directly in communication with each other, and the same is true of the opening of the normally closed main suction valves which place the variable-volume chamber means 402 and 402′ directly in communication with each other through the suction conduit 408. However, if it is desired to avoid such communication between the plurality of variable-volume chamber means, then it is possible to use the non-return valves 215, 216, etc. shown in FIG. 2 and referred to above.

It is to be noted that because the pump 409 is never required to transmit air under pressure to either of the variable-volume chamber means of FIG. 4 while the container 401 is being filled with fluid under pressure by the pump, the pump is never called upon to provide in either of the variable-volume chamber means 402, 402′ a certain maximum pressure above atmospheric pressure. Such an operation would require the pump to have a larger capacity than is necessary with the arrangement of the invention. With the arrangement of the invention the pump 409 will either be called upon to maintain the pressure in the container 401 at a given amount above atmospheric pressure and the pressure in either of the variable-volume chamber means at a given amount above the pressure in the container 401, but the pump 409 will never be called upon to provide both of these amounts of pressure differential at any one time, so that as a result the pump can have a capacity only great enough to provide the pressure differential between the atmosphere and the interior of the container 401, and again approximately the same pressure differential between the interior of the container 401 and the maximum pressure in either of the variable-volume chamber means 402 and 402′.

The above-described structure of FIG. 4 is not limited to a use only with an assembly as shown in FIG. 4. For example, in any of the embodiments of FIGS. 1–3, it is possible to replace the pump 111, 211, 311 with the pump 409 of FIG. 4 together with the valve assembly 415 and of course the pressure measuring device 423, the suction conduit 428 and all of the remaining parts of this structure for maintaining a certain minimum pressure in the interior of the container 401.

While all of the embodiments described above employ purely mechanical, as distinguished from electrical, elements for producing the desired controls, the embodiment of FIG. 5 shows electrical structure which can be used in accordance with the invention.

Referring now to FIG. 5, there is illustrated therein a container 501 for air under pressure, and within the container 501 there is situated a valve block 502, an air pump 503, a driving motor 504 to drive the air pump 503, a pressure measuring device 505, and a quick-action switch 506 actuated by the pressure measuring device 505, all of these latter elements being situated within the container 501, as illustrated in FIG. 5. At the exterior the container 501 there are the pairs of variable-volume chamber means 507, 507′ and a pair of control means 508, 508′ which sense the distance between the vehicle body and the axle therebeneath. For example the pair of chamber means 507 and the control means 508 can be associated with the front axle and the vehicle body thereover while the pair of chamber means 507′ and the control means 508′ can be associated with the rear axle. The front axle 509 is diagrammatically indicated in FIG. 5 by a dot-dash line connected to the variable-volume chamber means 507, and the rear axle 509′ is also indicated schematically by a dot-dash line shown associated with the pair of variable-volume chamber means 507′.

The valve block 502 is formed in its interior with a pair of chambers 510 and 511. These chambers communicate by way of conduits 512 and 513, respectively, with the pressure and suction sides of the pump 503. Thus, as is indicated by the arrow at the pump 503 of FIG. 5 the fluid under pressure will flow from the pump to the conduit 512 into the pressure chamber 510 while the suction chamber 511 will communicate through the conduit 513 with the suction side of the pump 503. The pressure chamber 510 communicates through a normally open auxiliary pressure valve 514 and an outlet 516 controlled by the valve 514 with the interior of the container 501, and in a similar manner the suction chamber 511 communicates through a normally open auxiliary suction valve 515 and an outlet 517 controlled thereby with the interior of the container 501. A main pressure valve 518 communicates through a passage 520 in the valve block with both of the variable-volume chamber means 507, and a second main pressure valve 518′ communicates through a passage 520′ with both of the variable-volume chamber means 507′, these main pressure valves 518 and 518′ being normally closed. In a similar manner a normally closed main suction valve 519 communicates through the passage 520 with both of the variable-volume chamber means 507 and a normally closed main suction valve 519′ communicates through the passage 520′ with both of the variable-volume chamber means 507′.

The suction chamber 511, which comprises a suitable hollow portion in the interior of the valve block and which communicates with the suction side of the pump 503, communicates through a non-return valve 521 with a conduit 522 which in turn communicates with a suction inlet 523 carried by a wall of the container and communicating with the outer atmosphere through a suitable air filter, and this conduit 522 leads to the pressure measuring device 505 which thus remains in communication with the outer atmosphere, and in addition the piston 505b of the device 505 is acted on by the pressure within the container 501, a spring 505a in the cylinder of the pressure measuring device acting on the piston 505b, so that the position of the piston 505b along the cylinder will be indicative of the extent to which the pressure in the container 501 exceeds the outer atmospheric pressure.

The several valves 514, 515, 518, 518′, 519 519′ are actuated by electromagnets 524, 525, 526, 526′, 527, and 527′, respectively, and the magnets 524 and 525 which cooperate with the auxiliary pressure and suction valves 514 and 515 have a pair of exciting coils for each of these electromagnets. Thus, the electromagnet 524 has a pair of coils 528 and 529, while the electromagnet 525 has a pair of exciting coils 530 and 531. The electromagnets which cooperate with the main pressure and suction valves, however, have only a single exciting coil each, and thus it will be seen that the electromagnets 526 and 526′ have the exciting coils 532 and 532′, while the exciting coils 533 and 533′ are provided for the electromagnets 527 and 527′, respectively, which cooperate with the main suction valves 519 and 519′. The valves and their electromagnets are arranged in such a way that when the exciting coils of the several electromagnets are energized the auxiliary, normally open valves 514 and 515 will close while the main, normally closed valves 518, 518′, 519, 519′, will open. Furthermore, the electromagnets 524 and 525 actuate in addition to the valves 514 and 515, the switches 534 and 535 which are located in the circuit of the electric motor 504 which drives the pump 503.

The pair of control means 508 and 508′ which sense in a known way changes in the distance between the vehicle body and the axles therebeneath, include the switch-actuating levers 536 and 536′ which assume angular positions determined by the distance between the vehicle body and the axle therebeneath. The lever 536 is shown as connected to a spring 537 and a dash-pot assembly 538. As is indicated diagrammatically the spring 537 is connected to the axle 509, and of course the dash-pot assembly 538 will be connected with a vehicle body, so that the lever 536 will assume angular positions determined by the distance between the vehicle body and axle 509, and the lever 536 is electrically conductive, is supported for turning movement as indicated diagrammatically in FIG. 5, and furthermore is grounded, so that when the distance between the vehicle body and axle decreases the lever 536 will engage the contact 539 and connect the latter with ground while when the distance between the vehicle body and axle increases above a predetermined magnitude the lever 536 will engage the contact 540 and place the latter in connection with ground. In much the same way the control means 508′ has its lever 536′ cooperating with the contacts 539′ and 540′ with the lever 536′ also being grounded and having its position determined by the spring 537′ which is connected to the axle 509′ and the dash-pot assembly 538′ which is connected to the vehicle body. Thus, whenever the levers 536 and 536′ engage the contacts 539 and 539′, a signal will be given to add fluid under pressure to the several variable-volume chamber means, while when the levers 536 and 536′ respectively engage the contacts 540 and 540′, a signal will be given to withdraw fluid under pressure from the several variable-volume chamber means.

The contact 539 is connected through a suitable electrical conductor with the exciting coil 532 of the electromagnet 526 as well as with the exciting coil 529 of the electromagnet 532. The contact 540 is connected through an elongated conductor with the exciting coil 533 of the electromagnet 527 as well as with the exciting coil 530 of the electromagnet 525. The conductor from the contact 539′ is connected with the exciting coil 532′ of the magnet 546′ and the coil 528 of the electromagnet 524, while the electrical conductor which is connected to the contact 540′ interconnects the latter with the coil 533′ of the electromagnet 527′ and with the coil 531 of the electromagnet 525. Thus, depending upon the signal which is obtained from the control means the main and corresponding auxiliary valves will be electrically controlled in a fully automatic manner to provide a flow of fluid in order to increase the volume or decrease the volume of either the chambers 507 or the chambers 507′.

With the exception of the coil 531 which cooperates with the auxiliary suction valve 515, all of the remaining exciting coils are electrically connected at their ends distant from the conductors which extend from the contacts which cooperate with the levers 536 and 536′ to a single conductor 541 which is connected to the contact 542 of the pressure switch 506 which is actuated by the pressure measuring device 505. One end of the coil 531 is connected with the contact 543 of the switch 506, and it will be noted that in the illustrated position of the parts these contacts 542 and 543 are electrically connected to each other by the switch 506. The other end of the coil 531, which is already connected with the contact 540′ is additionally connected with the contact 544 of the switch 506 and in a second, unillustrated position of the switch 506, this contact 544 is placed in electrical connection with a contact 545 which is grounded.

From the contact 543 of the switch 506 a conductor extends to the electrical connection 546 of the electric pump motor 504, and this conductor extends out beyond the container 501 to a connection 547 with a pole of the vehicle battery. Of course, the unillustrated ignition switch can be located in this circuit also. The other electrical connection 548 of the pump motor 504 is electrically connected with the contacts 549 and 550 of the switches 534 and 535 and is placed by these switches in connection with ground when the valves 514 and 515 are closed by excitation of their electromagnets.

The above-described structure of FIG. 5 operates in the following manner:

Assuming that the pressure of the air in the container 501 is above the predetermined pressure which is to be maintained therein then the pressure measuring device 505 will have the position shown in FIG. 5 and the switch 506 will be in the position shown in FIG. 5. Through the electrical connection 547 as well as the connection 546 and the electrically interconnected contacts 543 and 542 and the conductor 541, all of the exciting coils of the electromagnets, with the exception of the coil 531, are connected to the battery of the vehicle. Assuming now that the control means 508 provides a signal calling for additional air under pressure to be supplied to the variable-volume chamber means 507, then of course lever 536 will have engaged the contact 539 to place this contact in connection with ground, and as a result the exciting coils 532 and 529 of the electromagnets 526 and 524, respectively, are energized so that in this way the main pressure valve 518 and the auxiliary pressure valve 514 are respectively opened and closed. The closing of the valve 514 of course cuts off communication between the pressure side of the pump 503 and the interior of the container 501, and the opening of the valve 518 places the pressure conduit 512 of the pump 503 through the pressure chamber 510 in communication with the pair of variable-volume chamber means 507. Furthermore, the exciting of the electromagnet 524 has closed the switch 534 so that the pump motor 504 is now energized, inasmuch as the contact 548 of the motor 504 is connected upon closing of the switch 534 to ground, and thus the motor operates the pump 503 and fluid under pressure is pumped out of the chamber 501 through the passage 517 of the valve block 502 and the open valve 515 into the chamber 511 to be received thereby from the suction conduit 513 which delivers the fluid to the pump 503 to be pumped thereby through the pressure conduit 512 and the chamber 510 and the open valve 518 into the pair of variable-volume chamber means 507, and this operation will continue automatically until the lever 536 is again separate from the contact 539. As soon as the connection between contact 539 and lever 536 is broken the electromagnets 524 and 526 become unenergized so that the switch 534 opens to stop the operation of the motor, the valve 518 closes to cut off communication between the pump and the chambers 507, and the valve 514 opens to reestablish communication between the pressure side of the pump and the interior of the container 501.

In the event that the control means 508 calls for discharging fluid from the chambers 507, by engagement of lever 536 with the contact 540, then the valve 519 will be opened by the excitation of the coil 533 of the electromagnet 527, and at the same time by excitation of the coil 530 of the electromagnet 525 the valve 515 will be closed so that the suction chamber 511 is cut off from communication with the interior of the container 501. At the same time the excitation of the electromagnet 525 closes the switch 535 so that the motor contact 548 is again connected to ground and the motor now operates to drive the pump 503, and at this time the fluid from the chambers 507 will be sucked into the chamber 511 through the open valve 519 and the fluid will flow through the suction conduit 513 into the pump and out of the latter through the pressure conduit 512 and the open outlet 516 into the container 501.

Corresponding operations will take place depending upon the signals provided by the control means 508'. Thus, if the lever 536' engages the contact 539', then the coils 532' and 528 will be excited so as to open the normally closed valve 518' and close the auxiliary pressure valve 514, and thus the flow at this time will take place in the same way as when the valve 518 was opened and the auxiliary valve 514 was closed, except that now the fluid will flow into the chambers 507', and when the lever 536' engages the contact 540' the coils 533' and 531 will be energized so as to open the normally closed valve 519' and close the auxiliary suction valve 515 and thus provide a withdrawal of fluid from the chambers 507' into the suction conduit 513 and from the latter into the container 501 through the pump 503, the conduit 512, the open valve 514, and the outlet 516.

In the event that the pair of controls 508 and 508' simultaneously provide opposite signals, then the pump will operate simply to transfer the fluid from one set of chambers to the other set. For example if the lever 536 engages the contact 539 while the lever 536' engages the contact 540', then both of the valves 514 and 515 will be closed while the valve 519' will be open and also the valve 518 will be open, with the result that the pump 503 will pump fluid out of the chambers 507' through the open valve 519' into the suction conduit 511, from the latter through the conduit 513 to the pump, and from the pump through the conduit 512 into the chamber 510 from where the fluid flows through the open valve 518 into the chambers 507.

Assuming that under these conditions the lever 536 is separated from the contact 539 before the lever 536' is separated from the contact 540', then the valve 518 will close, the valve 514 will open and the withdrawal of fluid from the chambers 507' will continue, the only difference being that the fluid will now flow into the container 501.

In the event that the pressure in the container 501 falls below the predetermined level at which the pressure should be maintained as a minimum, then the piston 505b will yield to the atmospheric pressure and the spring 505a so as to open the connection between the contacts 536 and 542 and instead place the contacts 544 and 545 in electrical connection with each other.

The result of this displacement of the switch 506 is that the conductor 501 to which all of the exciting coils except the coil 531 are connected is now opened so that with the exception of the coil 531 none of the other coils can be excited. Therefore, at this time the auxiliary pressure valve 514 and all of the main pressure and suction valves must remain in their illustrated rest positions. As a result the pairs of variable-volume chamber means 507 and 507' remain disconnected from the rest of the apparatus independently of any controls which are called for by the pair of control means 508 and 508', since at this time circuits through the exciting coils of the electromagnets, with the exception of the coil 531, cannot be completed.

The coil 531 at this time can be energized by the conductor extending between the electrical connections 547 and 546 and extending from the latter to the coil 531 which now is connected to ground through the electrically interconnected contacts 544 and 545, so that at this time the switch 535 closes and the motor 504 is energized so as to drive the pump 503. Also, the excitation of the electromagnet 525 closes the auxiliary suction valve 515. The pump therefore pumps fluid out of the suction chamber 511 with the result that the non-return valve 521 automatically opens to admit air into the chamber 511 from where the air is pumped through the suction conduit 513 and the pump 503 into the pressure conduit 512 and the chamber 510 from where the fluid flows through the open valve 514 of the outlet 516 into the container 501. The air of course flows through the inlet 523 and the exterior air filter to the non-return valve 521 before reaching the suction chamber 511 at this time. When the predetermined pressure in the container 501 is reached the pressure measuring device 505 returns to the illustrated position where the electrical connection between contacts 544 and 545 is broken and instead the electrical connection between the contacts 542 and 543 is reestablished, so that the structure is again in a position to provide the automatic controls in the manner described above. It is to be noted that during the time when the container 501 is being filled the several chamber pairs 507 and 507' not only are closed off from the remainder of the apparatus but also they are closed off from communication with each other so that it is not possible for the pressure in one set of chambers to become equalized with the pressure in the other set of chambers.

It is of course clear that electrical connections different from but equivalent to those of FIG. 5 are included in the invention.

In principle, the structure of FIG. 5 operates in the same way as the structure of FIG. 1, except that in FIG. 5 the structure is electrically controlled while in FIG. 1 is mechanically controlled.

It is clear that the structure of FIG. 5 is easily adapted for use with further sets of independent variable-volume chambers or even groups thereof, since all that is required is to provide connections to the suction or pressure chambers 511 and 510 for the several additional units which it is desired to serve with the necessary valves and electromagnetic actuating devices therefor and the connections thereto. The same auxiliary suction and pressure valves 515 and 514 can be used for additional units, and all of the additional valves and exciting coils and the like will operate in a manner corresponding to that described above in connection with FIG. 5.

It will be understood that each of the elements described above, or two or more together, may also find a useful application in other types of suspensions differing from the types described above.

While the invention has been illustrated and described as embodied in fluid suspensions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle suspension, in combination, variable-volume chamber means adapted to be situated between the axle and body of a vehicle for yieldably and resiliently supporting the body of the vehicle over said axle with a fluid under pressure in the interior of said variable-volume chamber means; a container adapted to contain said fluid under pressure; pump means in said container, said pump means having a suction side and a pressure side; pressure conduit means operatively connected to said pressure side of said pump means and said variable-volume chamber means and said container for providing communication between said pressure side of said pump means and said chamber means and the interior of said container; suction conduit means operatively connected to said suction side of said pump means and to said container and variable-volume chamber means for providing communication between the suction side of said pump means and the interior of said container as well as between the suction side of said pump means and said variable-volume chamber means; a normally closed main pressure valve means in said pressure conduit means for controlling communication between said pump means and chamber means; a normally open auxiliary pressure valve means operatively connected to said pressure conduit means for controlling communication between said pump means and the interior of said container; a normally closed main suction valve means in said suction conduit means for controlling communication between said suction side of said pump means and said chamber means; a normally open auxiliary suction valve means operatively connected to said suction conduit means for controlling communication between said suction side of said pump means and the interior of said container; and control means sensing the distance between said body of said vehicle and said axle and operatively connected to all of said valve means for opening said normally closed main pressure valve means and simultaneously closing said normally open auxiliary pressure valve means for cutting off communication between the interior of the container and the pressure side of said pump means and for providing communication between the pressure side of said pump means and said chamber means so that said pump means will then pump fluid from the interior of said container through said normally open auxiliary suction valve means and said suction conduit means into said pump means and out of the latter through said pressure conduit means and said main pressure valve means into said chamber means for increasing the distance between the vehicle body and axle when said control means senses that said distance is less than a predetermined magnitude, and said control means automatically closing said auxiliary suction valve means and opening said main suction valve means for cutting off communication between said suction conduit means and the interior of said container and for providing communication between said chamber means and said pump means through said suction conduit means for withdrawing with said pump means fluid under pressure from said chamber means to pump said fluid under pressure out through said pressure conduit means and normally open auxiliary pressure valve means into said container when said control means senses that the distance between the vehicle body and axle is greater than said predetermined magnitude.

2. In a vehicle suspension, in combination, a plurality of variable-volume chamber means adapted to be filled with fluid under pressure and adapted to be situated between axle means of the vehicle and a vehicle body situated over said axle means for yieldably and resiliently supporting the vehicle body over said axle means, pump means having a pressure side and a suction side; a container for said fluid under pressure, said pump means being situated in said container; and, for each of said variable-volume chamber means, an assembly comprising pressure conduit means operatively connected to and providing communication between said pressure side of said pump means, said chamber means, and said container, suction conduit means operatively connected to and providing communication between said suction side of said pump means, said container, and said chamber means, normally closed main pressure valve means and normally open auxiliary pressure valve means operatively connected in and with, respectively, said pressure conduit means for respectively controlling communication between said pressure side of said pump means and said chamber means and interior of said container, a main, normally closed main suction valve and an auxiliary normally open suction valve operatively connected in and with, respectively, said suction conduit means for respectively controlling communication between said suction side of said pump means and said chamber means and said suction side of said pump means and the interior of said container, and control means sensing the distance between the vehicle body and axle means and operatively connected with all of said valve means for opening said normally closed main pressure valve and closing said normally open auxiliary pressure valve to provide communication between said pressure side of said pump means and said chamber means and to cut off communication between said pressure side of said pump means and said container, so that said pump means will pump fluid from the interior of said container through said normally open auxiliary suction valve means into said chamber means when said control means senses that the distance between said body and axle means is less than a predetermined magnitude, and said control means opening said normally closed main suction valve means and closing said normally open auxiliary suction valve means for pumping fluid under pressure from said chamber means into said container through said normally open auxiliary pressure valve means when said control means senses that the distance between said vehicle body and axle means is greater than said predetermined magnitude.

3. In a suspension as recited in claim 2 and wherein when said plurality of control means sense that movement of fluid between said container and said plurality of chamber means is simultaneously required in the same directions, said plurality of valve assemblies operate in sequence to regulate said plurality of chamber means, respectively.

4. In a vehicle suspension, in combination, a plurality of variable-volume chamber means adapted to contain fluid under pressure and to be situated between an axle means and a body of a vehicle for resiliently and yieldably supporting said body over said axle means; a plurality of pressure conduit means respectively communicating with said plurality of chamber means for supplying fluid under pressure thereto; a plurality of suction conduit means respectively communicating with said plurality of chamber means for respectively withdrawing fluid therefrom; a pump having a pressure side communicating with said plurality of pressure conduit means and a suction side communicating with said plurality of suction conduit means; a container containing fluid under pressure and said pump being housed within said container; a plurality of normally closed main pressure valve means respectively connected in said plurality of pressure conduit means for normally closing the latter; a plurality of normally closed main suction valve means respectively connected in said plurality of suction conduit means for normally closing the latter; at least one auxiliary pressure valve means communicating with the pressure side of said pump and with the interior of said container, said auxiliary pressure valve means being normally open; at least one auxiliary suction valve means communicating with the suction side of said pump and with the interior of said container and also being normally open; and a plurality of control means respectively provided for said plurality of chamber means for sensing when fluid under pressure must be supplied thereto or withdrawn therefrom in order to maintain said vehicle body at a given distance over said axle means, said plurality of control means being operatively connected to said plurality of main pressure valve means for opening the latter and to said auxiliary pressure valve means for closing the latter when fluid under pressure is required to be supplied to said plurality of chamber means, respectively, said pump then pumping fluid from the interior of said container through said normally open auxiliary suction valve means into said pump and out of the latter through the pressure conduit means connected to whichever chamber means requires fluid under pressure and whose main pressure valve means has been opened, and said plurality of control means respectively opening said plurality of main suction valve means and closing said auxiliary suction valve means to provide communication between the suction side of said pump and said plurality of chamber means, so that whenever any one of said chamber means is required to have fluid withdrawn therefrom said control means will open the suction conduit means connected thereto so that said pump will withdraw fluid out of the latter chamber means, displace it into said container through said normally open auxiliary pressure valve means, and thus restore said given distance between said vehicle body and axle means.

5. In a suspension as recited in claim 4, a plurality of additional variable-volume chamber means respectively communicating with said plurality of first-mentioned variable-volume chamber means to be simultaneously controlled therewith, respectively.

6. In a suspension as recited in claim 4, a single pressure conduit communicating with the pressure side of said pump and with all of said pressure conduit means.

7. In a suspension as recited in claim 4, a single suction conduit communicating with the suction side of said pump and with all of said suction conduit means.

8. In a suspension as recited in claim 4, a plurality of auxiliary pressure valve means respectively provided for said plurality of chamber means and respectively connected in series and communicating with each other with only one of said auxiliary pressure valve means communicating directly with the pressure side of said pump and with only one of said auxiliary pressure valve means communicating with the interior of said container.

9. In a suspension as recited in claim 4, a plurality of auxiliary suction valve means respectively provided for said plurality of chamber means and connected in series and communicating with each other with only one of said auxiliary suction valve means communicating directly with the suction side of said pump and with only one of said plurality of auxiliary suction valve means communicating with the interior of said container.

10. In a suspension as recited in claim 4, one of said pressure conduit means and one of said suction conduit means communicating directly with said pressure and suction side of said pump, a plurality of auxiliary suction valve means and a plurality of auxiliary pressure valve means respectively provided for said plurality of chamber means, one of said auxiliary pressure valve means communicating with the pressure side of said pump and one of said auxiliary suction valve means communicating with the suction side of said pump, pressure connecting conduit means connected to and providing communication between said one auxiliary pressure valve means and remaining auxiliary pressure valve means, suction connecting conduit means connected to and provided communication between said one auxiliary suction valve means and the remaining auxiliary suction valve means, the remaining pressure conduit means being connected to and communicating with said pressure connecting conduit means and the remaining suction conduit means being connected to and communicating with said connecting suction conduit means.

11. In a suspension as recited in claim 4, an electric motor operatively connected to said pumps for driving the same and located in an electrical circuit, and any one of said plurality of control means when called upon to provide flow of fluid to or from any one of said chamber means actuating said circuit to close the latter and energize said motor.

12. In a suspension as recited in claim 4, the plurality of valve means which control the flow of pressure fluid to or from any one of said chamber means being united into a single assembly.

13. In a suspension as recited in claim 4, said plurality of control means extending into the interior of said container.

14. In a suspension as recited in claim 4, a plurality of electromagnets respectively connected operatively to all of said valve means, said plurality of control means being electrically connected with said electromagnets for energizing and de-energizing the same.

15. In a suspension as recited in claim 14, a plurality of electrical switches respectively located in the electrical connections between said plurality of control means and said electromagnets, said plurality of control means respectively closing switches for energizing electromagnets connected to said main and auxiliary pressure valve means when fluid under pressure is required to be supplied to one or more of said chamber means and closing switches for energizing electromagnets connected to said plurality of main suction valve means and said auxiliary suction valve means when fluid is required to be withdrawn from one or more of said chamber means.

16. In a suspension as recited in claim 15, an electric motor connected to said pump for driving the latter and connected into an electric circuit with said auxiliary pressure and suction valve means, and the motor circuit remaining unenergized unless one of said auxiliary valve means is closed.

17. In a suspension as recited in claim 4, means providing communication between said pump and the exterior of said container for operating said pump to supply fluid under pressure from the exterior of said container to the interior thereof for maintaining the fluid in the container above a predetermined minimum pressure, and means preventing said pump from supplying fluid under pressure to or withdrawing fluid under pressure from any of said chamber means while said pump supplies fluid under pressure to the interior of said container.

18. In a suspension as recited in claim 4, a pair of additional pressure and suction valves respectively communicating with the pressure and suction sides of said pump and with said plurality of pressure conduit means and suction conduit means for providing communication between said pump and said plurality of pressure conduit means and suction conduit means, said additional valves being normally open, a pair of further pressure and suction valves respectively communicating with the pressure and suction sides of said pump, said further pressure valve communicating with the interior of the container and said further suction valve communicating with the exterior of the container and said further pressure and suction valves being normally closed, and pressure sensing means located in the container for sensing the pressure therein and being operatively connected to said additional and further valves for maintaining them in their normal positions when the pressure in the container is above a given value and for closing said normally open additional pressure and suction valves and opening said normally closed further pressure and suction valves when the pressure in the container is less than said predetermined value so that said pump will then pump fluid from the exterior of the container through said further suction valve to the suction side of said pump and from the pressure side of the latter through said further pressure valve into the container until the predetermined minimum pressure value is restored in said container.

19. In a suspension as recited in claim 4, a plurality of electromagnets respectively connected operatively to all of said valve means for opening the normally closed valve means and for closing the normally open valve means when said electromagnets are energized, said electromagnets being connected electrically with said plurality of control means to be electrically controlled thereby, and a first interrupter switch connected into the circuit of all of said electromagnets for preventing them from being energized except when said first interrupter switch is closed, pressure sensing means located in said container to sense the pressure therein and maintaining said first interrupter switch closed as long as the pressure in the container is above a given value, said pressure sensing means opening said first interrupter switch when the pressure in the container falls below said value, a second interrupter switch closed by said pressure sensing means when the pressure falls below said value, an additional electromagnet connected operatively to said auxiliary suction valve means for closing the latter, said additional electromagnet being connected to said second interrupter switch so that said auxiliary suction valve means is closed when said second interrupter switch is closed and all of the remaining valve means cannot be actuated, and non-return valve means providing communication between the suction side of said pump and the exterior of said container for admitting fluid to the suction side of said pump from the exterior of said container when said second interrupter switch is closed, whereby the fluid sucked through said non-return valve means will pass from the pressure side of said pump through the normally open auxiliary pressure valve into the container until said given value of pressure is restored therein, whereupon said pressure sensing means will open said second interrupter switch and close said first interrupter switch to restore the normal operations.

20. In a suspension as recited in claim 4, all of said valve means being united into a single unitary structure in the interior of the container.

References Cited by the Examiner

UNITED STATES PATENTS

| | | |
|---|---|---|
| 2,862,725 | 12/58 | Jackson. |
| 2,888,272 | 5/59 | Fletcher. |
| 2,895,743 | 7/59 | Jackson. |
| 2,895,744 | 7/59 | Jackson. |
| 2,993,705 | 7/61 | D'Avigdor. |
| 3,122,379 | 2/64 | Allinquant. |

A. HARRY LEVY, *Primary Examiner.*